United States Patent [19]
Bachmann

[11] Patent Number: 4,493,342
[45] Date of Patent: Jan. 15, 1985

[54] DOUBLE LOUVER DAMPER

[75] Inventor: Lothar Bachmann, Auburn, Me.

[73] Assignee: Bachmann Industries, Inc., Lewiston, Me.

[21] Appl. No.: 545,001

[22] Filed: Oct. 24, 1983

[51] Int. Cl.³ .............................................. E06B 7/092
[52] U.S. Cl. .............................. 137/601; 137/614.11; 49/77
[58] Field of Search ............... 137/601, 614.11; 49/74, 49/77, 78

[56] References Cited

U.S. PATENT DOCUMENTS

| | | | |
|---|---|---|---|
| 2,758,345 | 8/1956 | White | 49/77 X |
| 3,281,113 | 10/1966 | Ahern | 137/601 X |
| 3,284,951 | 11/1966 | Shapiro | 49/77 X |
| 3,500,583 | 3/1970 | McKinnon | 49/78 |

FOREIGN PATENT DOCUMENTS 2134189  1/1973  Fed. Rep. of Germany .......... 49/78

*Primary Examiner*—Martin P. Schwadron
*Assistant Examiner*—Stephen M. Hepperle

[57] ABSTRACT

A double louver damper for use in a duct system conveying hot gases and particles in order to permit safe entry to be made therein when servicing is required has a frame to be incorporated in the system. The frame has two parallel seals surrounding the flow path, one spaced downstream relative thereto and to the other. The frame pivotally supports two sets of the same number of blades, one set for each seal and with the axes of the corresponding blades of the two series in the same plane. Each blade is in the form of an elongated, centrally pivoted diamond and is provided with coplanar lengthwise and end sealing portions of the same radial extent. When the damper is closed, the long axes of the blades are substantially in the same plane with the proximate lengthwise sealing portions overlapping and the remaining lengthwise and end sealing portions engaging the appropriate one of the seals. When the damper is open, each pair of corresponding blades partially overlap to establish a streamlined parallelogram of the thickness of one blade but half again as long with its long sides parallel to the flow path.

7 Claims, 8 Drawing Figures

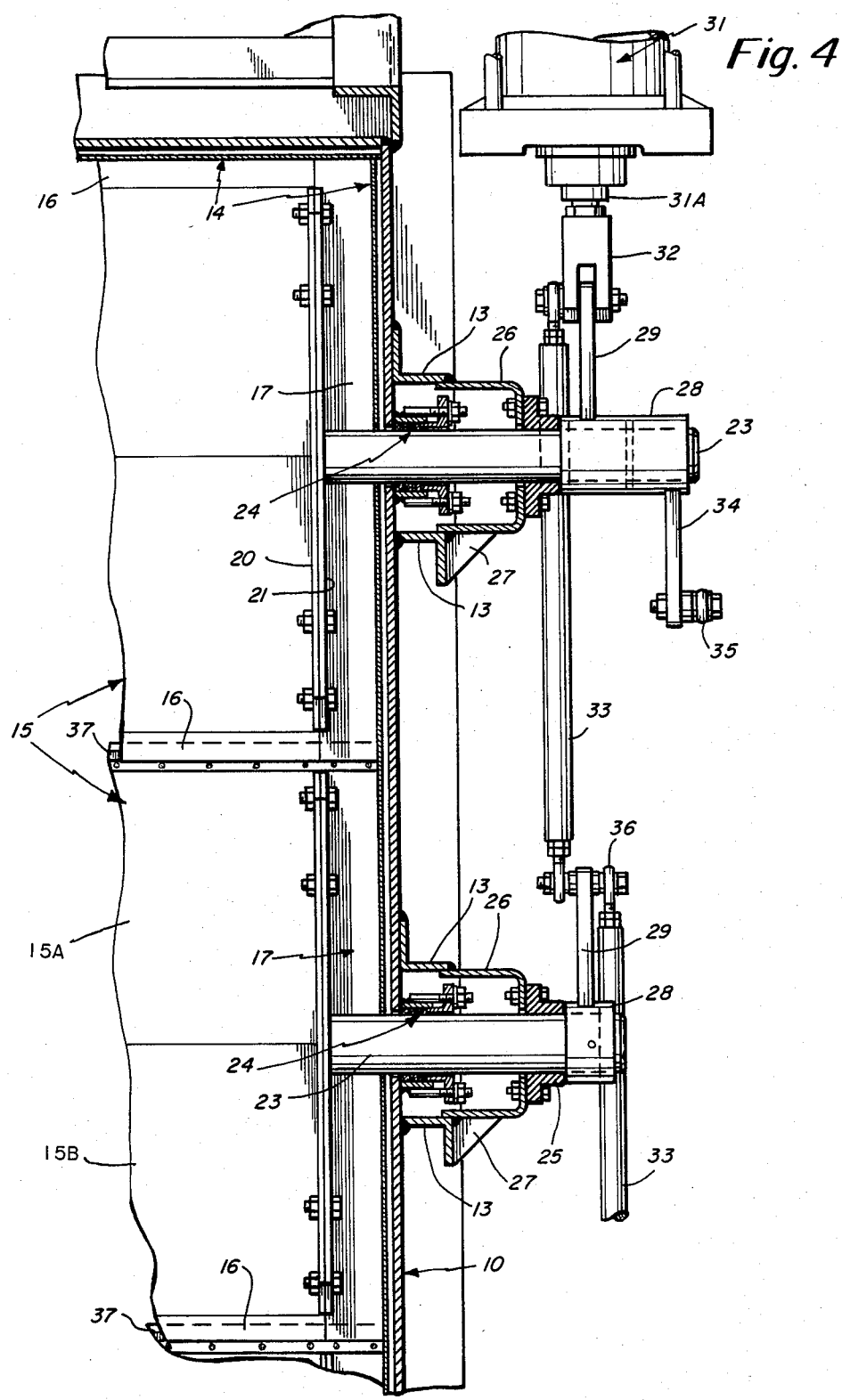

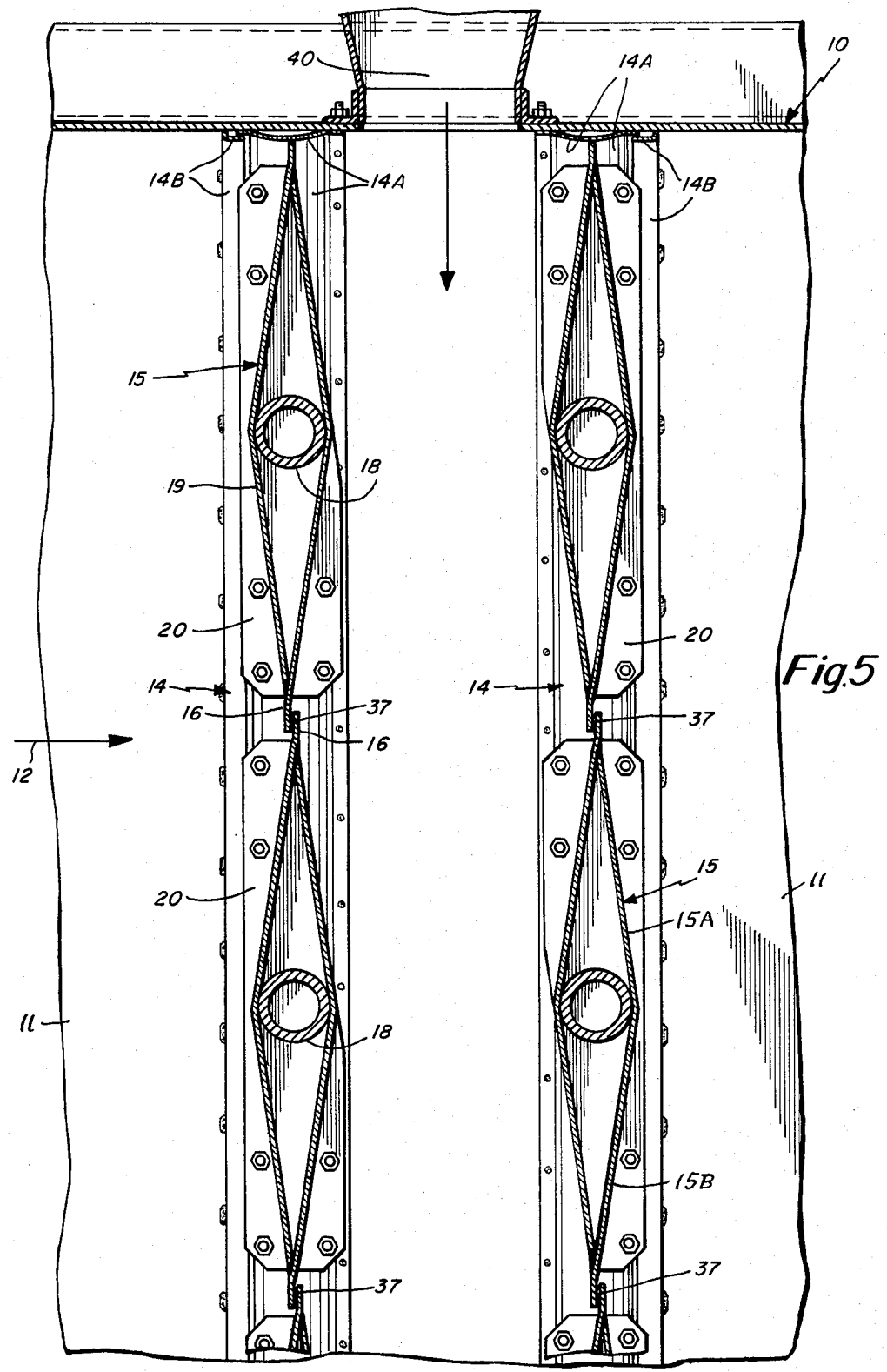

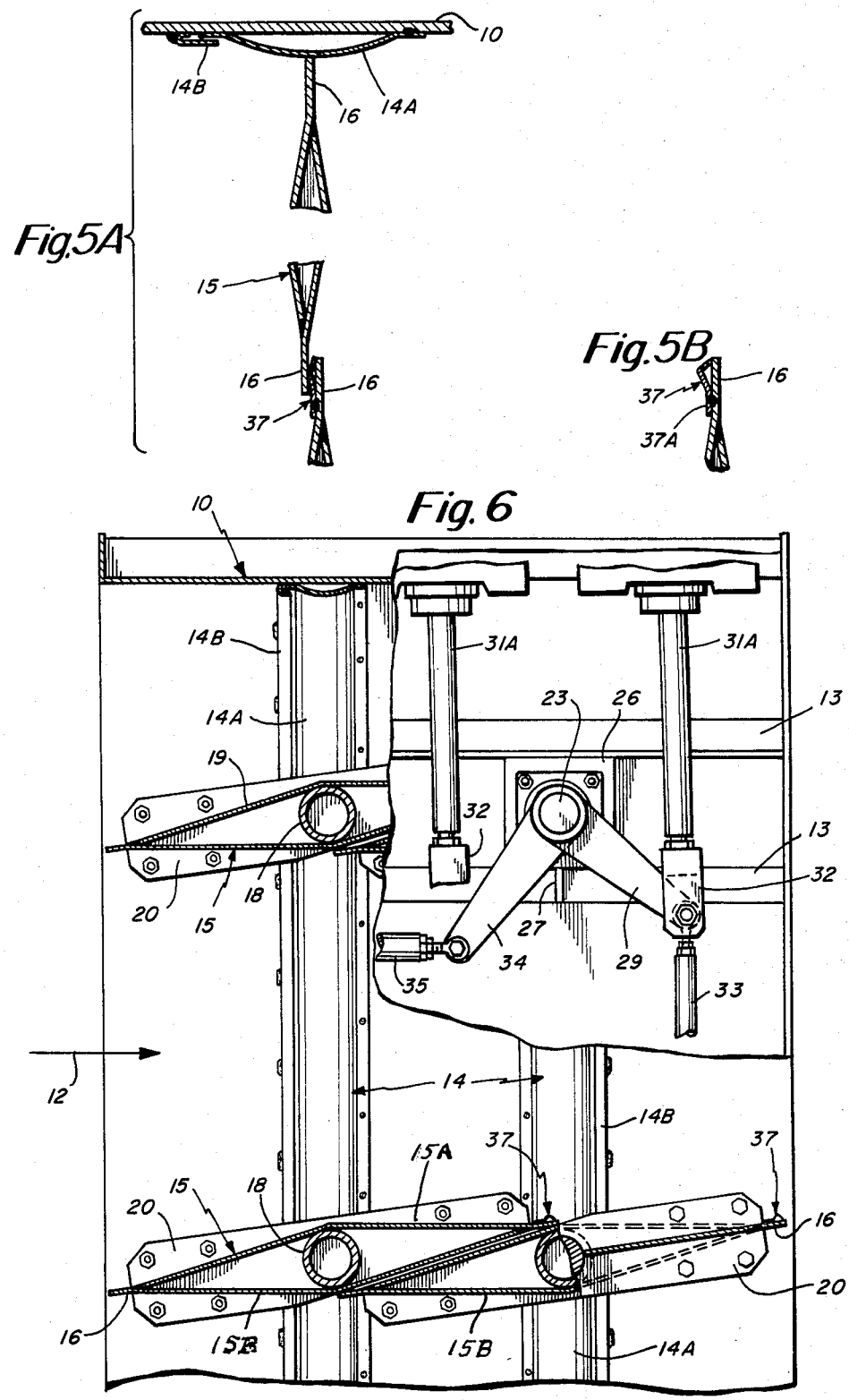

DOUBLE LOUVER DAMPER

BACKGROUND OF THE INVENTION

In many large duct systems where isolation of components therein is required to permit safe entry for their servicing, double louver dampers offer the advantage over dampers of the guillotine type in that they enable the gaseous flow through the system to be modulated.

Double louver dampers have, however, certain disadvantages among which is that the two series of blades are so spaced that they are independent of each other with the result that when the dampers are open, the blades of each louver cause a pressure dip to occur in the gas flow therein with a consequent increase in operating costs required to maintain the wanted flow rate. When such dampers are closed, the sealing of the blades is a requirement that, as far as I am aware, has not been satisfactorily attained.

THE PRESENT INVENTION

The general objective of the present invention is to provide double louver dampers in which the above referred-to objections are satisfactorily met.

In accordance with the invention, this objective is attained with a frame to be incorporated in a duct system and pivotally supporting two sets of the same number of blades with the axes of corresponding blades of the two series in the same plane and with one set of blades spaced downstream of the other. Each blade is in the form of a centrally pivoted, elongated diamond provided with lengthwise and end coplanar sealing portions of the same radial extent and the frame has internal seals, one for each series of blades and surrounding the flow path and in the plane of the blade axes.

The blades are so dimensioned and spaced that when the damper is closed the proximate lengthwise sealing portions of the adjacent blades of each set overlap and the remaining lengthwise and the end sealing portions in engagement with the appropriate seal. The two sets of blades are so spaced that when the damper is open, each of the corresponding two blades of the two series partially overlap to establish a unit which in cross section is a streamlined parallelogram the thickness of which is that of a single blade and the length of which is half again as long as a single blade with the long sides parallel to the flow path. As a consequence, when the damper is open only a single pressure drop occurs.

Another important objective of the invention is to ensure the proper sealing of the overlapping sealing portions of the blade, an objective attained by providing one of each two overlapping portions with a lengthwise, resiliently yieldable seal engageable with the other of said portions.

In order that such seals will remain effective for long periods, each is an appropriate length of suitably resilient flexible steel, preferably a high grade nickel alloy, having a lengthwise, central protuberance, in practice V-shaped with one margin anchored to the appropriate blade portion and with its other margin free and close to the edge of that portion.

The two sets of louvers are pivoted together by power operated means between their open and closed positions with the power operated means in practice, standard pneumatic actuators operable not only to effect the pivoting of the blades between their two positions but also to exert such pressure on the seals of the overlapping blade portions that their protuberances are at least partially flattened.

Air under pressure is introduced between the two sets of blades when the damper is closed, when zero leakage must be assured.

Other objectives of the invention and the manner in which they are attained will be apparent from the following description of its preferred embodiment and from the appended claims.

PRIOR ART STATEMENT

While double louver dampers have been used for some time including those having blades in the form of an elongated diamond, there is none of which I am aware that, when the damper is closed has effective sealing of overlapping blade portions and that, when the damper is open, did not cause two successive pressure drops in the flowing gas stream.

BRIEF DESCRIPTION OF THE DRAWINGS

The drawings illustrate a preferred embodiment of the damper in accordance with the invention of which

FIG. 4 is a section on the scale of FIG. 3 and taken approximately along the indicated line 4—4 of FIG. 1;

FIG. 5 is a section, taken approximately along the indicated line 5—5 of FIG. 2;

FIG. 5A is a fragmentary section showing the seal between overlapping blade portions as compressed;

FIG. 5B is a fragmentary section showing a blade portion with the lengthwise seal as uncompressed; and FIG. 6 is a fragmentary and partly sectioned side view showing the blades and linkage as positioned when the damper is opened by the operating means.

THE PREFERRED EMBODIMENT OF THE INVENTION

The double louver damper illustrated by the drawings has a rectangular frame 10 dimensioned to be incorporated in a duct system 11 carrying hot gases and abrasive particles with the direction of the flow path thereof indicated by the arrow 12. The frame 10 has its sides provided with vertically spaced pairs of parallel, transverse stiffeners 13 with each pair at one side transversely aligned with a corresponding pair at the other side.

Figure 3:
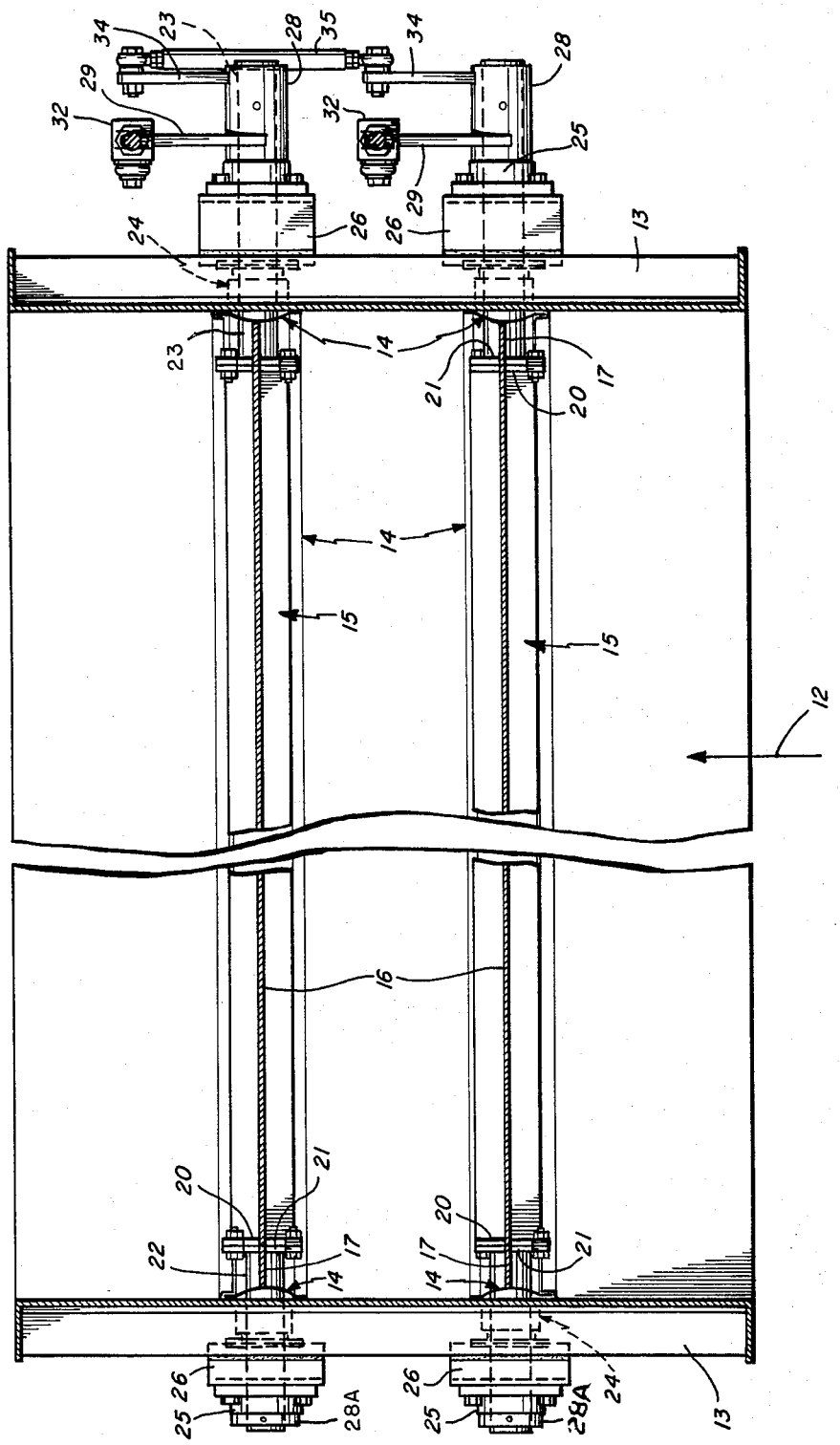
FIG. 3 is a section, on an increase in scale, taken approximately along the indicated line 3—3 of FIG. 2.

Secured to the inner surfaces of the frame 10 to continuously surround the flow path are a pair of parallel seals, generally indicated at 14, one for sealing the periphery of the upstream series of louver blades and one for sealing the series of blades on the downstream side thereof. The blades of both series are generally indicated at 15 and both series contain the same number of blades. Each seal, see FIGS. 3, 5, and 6, is of a high quality nickel alloy steel of appropriate length with its thickness in the approximate range of 0.018 to 0.025 inches in order to ensure sufficient flexibility to enable an effective seal to result when engaged by appropriate sealing portions of the blades 15. Each seal 14 has a central lengthwise convex portion 14A with one margin welded to the frame 10 and with its other margin slidably confined by a retainer 14B welded to the frame 10 and in practice formed from half hard sixteen gauge stainless steel. With this construction, the seals 14 can respond freely to thermal changes as well as to the pressure of the sealing portions, presently to be described, of the blades 15. It will be appreciated that the resiliency of the seals 14 is such as to cause them to shed any encrusting debris.

Figure 2:
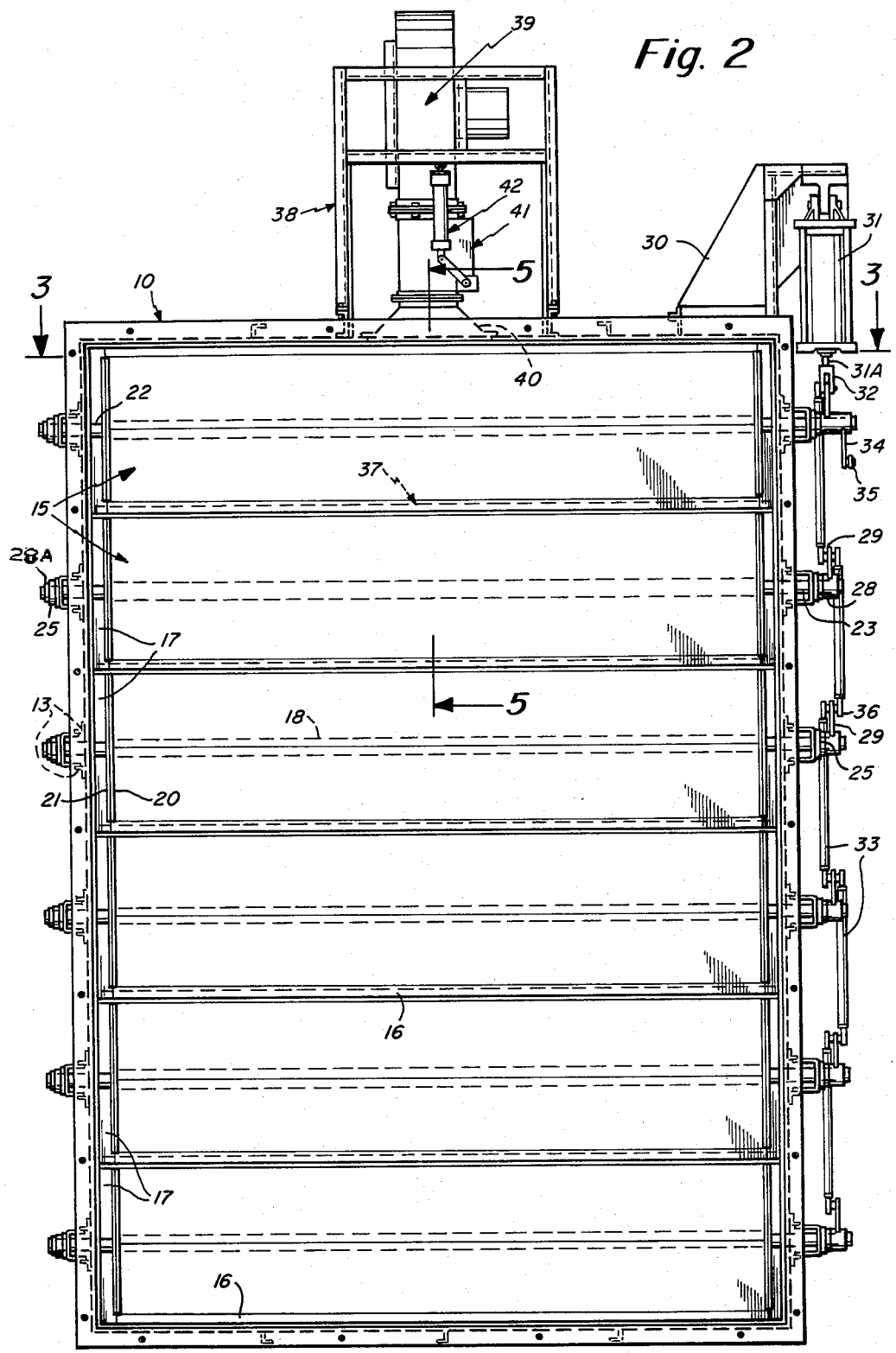
FIG. 2 is a section taken approximately along the indicated line 2—2 of FIG. 1.

Each blade 15 is in the form of an elongated diamond and includes flat, coplanar lengthwise and end straight sealing portions 16 and 17, respectively. Each blade has a torque tube 18 at its center and a metal skin 19, in practice of a high quality carbon steel the thickness of which is in the approximate range of one-eighth to one-quarter of an inch. The skin is formed from two identical sheets of a length appropriate for the width of the frame 10. Each sheet has one of its margins welded to the other sheet close to but short of the corresponding margin of the other sheet, thus to establish the lengthwise straight, sealing portions 16 which are disposed in a plane inclusive of the axis of the tube 18. The diameter of the torque tubes 18, typically four inches, determines the thickness of the blades 15 and the skin-forming sheets are dimensioned to establish a wanted blade width several times the maximum thickness. For convenience, each blade 15 may be regarded as having first and second, identical, acutely angled and flat sided halves 15A and 15B joined by obtuse angles fitting against opposite portions of the torque tube 18. Each blade 15 has flanges 20 closing its ends to each of which an identical flange 21 is bolted and to which end sealing portions 17, of the same stock as is used for the skin 19, are welded to lie in the plane of the sealing portions 16 and with their proximate side edges abutting and their end edges in alignment with the appropriate one of the edges of the sealing portions 16. Each flange 21 has a stub shaft coaxial with the torque tube 18 to which and the stub shaft the end portions 17 are welded. As viewed in FIG. 2, the stub shafts at the left hand side are indicated at 22 and those at the right hand side thereof are indicated at 23.

The stub shafts 22 and 23 extend through the appropriate one of the seals 14 at the sides of the frame 10, through the sides of the frame between pairs of stiffeners 13 and the stuffing boxes 24 welded to the outside of the frame 10 and are supported by bearings 25, each within a bearing mount 26 welded to the appropriate pair of stiffeners 13. In the case of the stub shafts 23, the bearing mounts are braced by gussets 27 and the ends of the stub shafts 26 have linkage hubs 28 pinned thereto with each hub 28 provided with an arm 29. The stub shafts 22 have collars 28A pinned thereto.

It will be noted that the axes of corresponding blades 15 of the two series are in the same plane and that the blades of each series are equally spaced and rotatably supported. Before describing the position of the blades 15 of each series to each other and to the seals 14 and the relationship of corresponding blades of the two series to each other and to the flow path when the blades are positioned with the damper open, the means by which the two positions of the blades 15 are established will be detailed.

Figure 1:
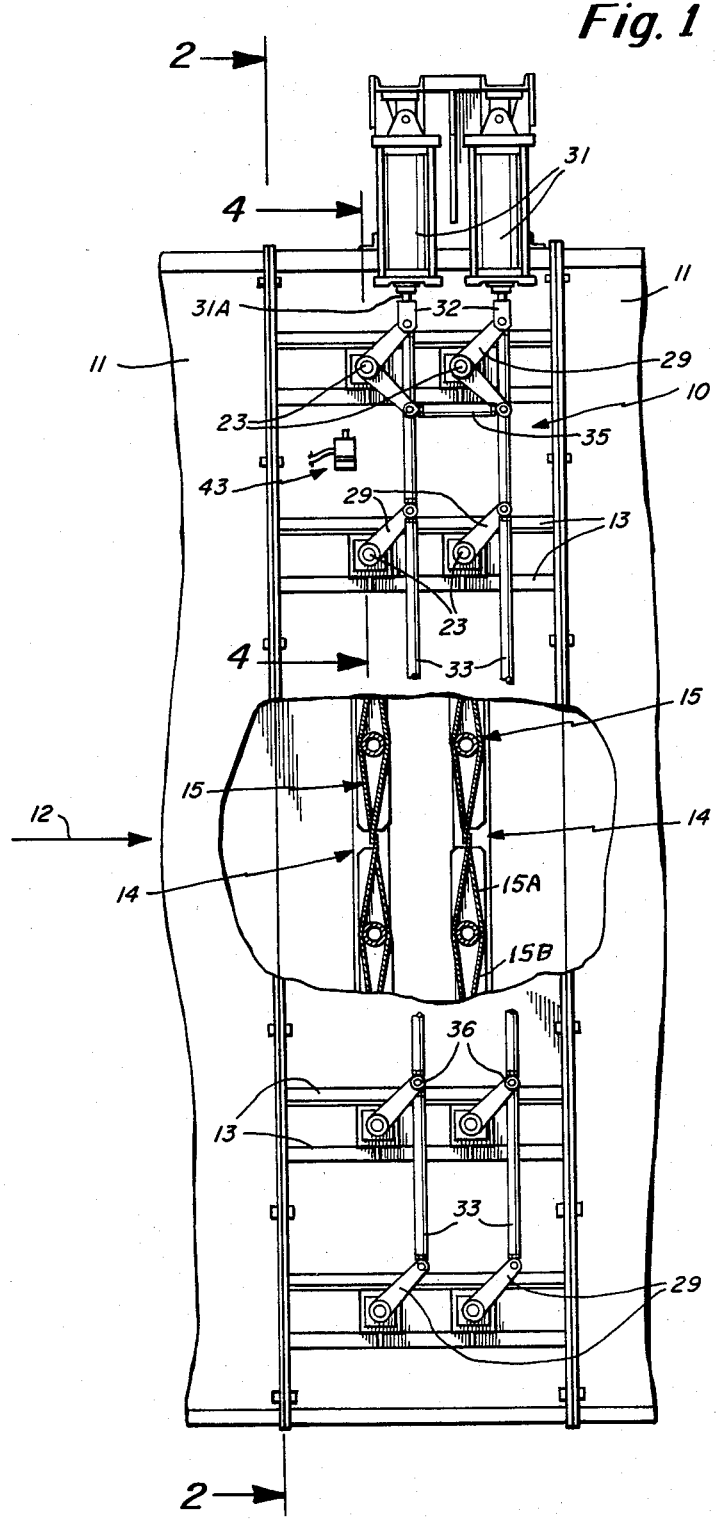
FIG. 1 is a partly sectioned side view of the damper showing the blades and linkage positioned when the damper is closed.

Brackets 30 mounted on the frame 10 on the right hand side thereof, as viewed in FIG. 1, support conventional, double acting pneumatic actuators, generally indicated at 31, one for each series of blades 15 and provided with a clevis 32 fixed on the end of its piston rod 31A, see FIG. 4.

Each clevis 32 has the arm 29 of the proximate hub 28 of the appropriate one of the series of blades 15 and the first of a series of pivotally interconnected link rods 33 pivotally connected thereto and each of said proximate hubs 28 has a second arm 34 to which the ends of a connecting rod 35 are pivotally connected. Each link rod 33 is pivotally connected as at 36 to the next hub arm 29 and the next link rod 33 so that when said actuators are operated, the blades 15 of the two series are turned together and to the same extent to effect their open or their closed positions. The control system for the actuators 31 is not shown as such are well known.

When the damper is closed, the blades 15 of each series are positioned with their long axes substantially in the same plane with the remote blade portions 16 of the remote blades and the end portions 17 of all the blades in sealing engagement with the appropriate one of the seals 14, see FIGS. 1 and 5. The proximate blade portions 16 and the proximate ends of the blade portions 17 are then overlapping and in order to ensure their sealing engagement, one of each such overlapping blade portions 16, 17 is provided with a resiliently flexible seal 37 extending the full length and shown as an obtuse angle in cross section and including a flat margin 37A. Each seal 37, see FIGS. 5A and 5B, preferably is formed with strips of a high quality nickel alloy steel the thickness of which, in practice, is in the approximate range of 0.018 to 0.025 inches and has its margin 37A welded to the surfaces of the blade portions 16, 17 of the blade portion 15A that are disposed upstream when the damper is closed with the free edge of the seal 37 in engagement with the blade portions close to their edges and free to move relative thereto as it is compressed.

In this connection, it will be appreciated that an essential function of the actuators 31, in addition to their ability to effect the two positions of the damper blades 15 is to ensure that, when the damper is closed, enough pressure is exerted against the overlapping blade portions to partially compress the seals 37.

When the damper is open, corresponding pairs of blades of the two series have been so turned that the section 15A of the upstream blade 15 so overlaps the section 15B of the downstream blade as to form a unit which in cross section is a parallelogram the thickness of which is that of a single blade and the length of which is shown as approximately fifty percent greater. It will be noted that the flanges 20 and 21 are cut away to permit such overlapping of the sections 15A and 15. The long surfaces of the parallelogram are parallel to the flow path and while the units decrease the cross sectional area of the flow path, they are streamlined with reference thereto and cause but one pressure drop in the gaseous flow. It will be noted that when the damper is open, the seals 37 are minimally exposed.

It will be appreciated that the number of blades 15 in each series in any installation depends on their width and the dimensions of the frame while their thickness is held to the minimum consistent with blade strength. In practice, the blade width is selected as such that when the damper is open, the ends of the parallelogram will not protrude outside the frame 10.

While the two sets of blades 15, when the damper is closed, provide an effective barrier against leakage, zero leakage is assured by the introduction of air under pressure between the two sets of blades. For that purpose, the frame 10 has a support 38 for a motor operated fan, generally indicated at 39, which delivers air under pressure through the port 40 in the frame between the two series of blades when the damper 41 is opened by the double acting pneumatic actuator 42. Air is delivered between the two series of blades only when the damper is closed and while the control circuit for the fan motor may be manually operated, a normally open switch 43 is shown as schematically illustrative of the wanted function that is closed by the connecting rod 35 when the linkage has set the blades 15 in their closed positions.

From the foregoing, it will be apparent that, not only is effective sealing attained when a damper in accordance with the invention is closed and the consequences of two pressure drops avoided but also a more compact damper is provided due to the placing of the two series of blades sufficiently close to permit their wanted overlapping.

I claim:

1. A double louver damper for a duct system to enable safe entry to be made therein, said damper including a rectangular frame dimensioned to be incorporated in the duct system, two series of the same number of blades of the same size and shape, means rotatably connecting each blade of each series to said frame with one series upstream relative to the other and with the axes of corresponding blades of the two series in the same plane, each blade in the form of an elongated diamond with its pivot axis at the center of the junction of first and second acutely angled portions including coplanar lengthwise and end sealing portions of the same radial extent and resiliently flexible sealing means, one for each series and attached to the frame to surround the flow path, and power operated means to pivot simultaneously all blades of both series between open and closed positions, in said closed position, the sealing portions of the blades of each series substantially in the same plane with the longitudinal and end sealing portions of adjacent blades overlapping and the corresponding portions of the remote blades and the end sealing portions of all blades in sealing engagement with the appropriate portions of the sealing means for that series, and the two series so spaced that in said open position the acutely angled first portions of one blade of each corresponding pair thereof so overlap the second portion of the other blade of that pair as to establish a closed streamlined figure the height of which is the maximum thickness of either blade.

2. The double louver damper of claim 1 and resiliently yieldable sealing means attached to and extending across one of each of the two overlapping lengthwise and end sealing portions for engagement with the other of said overlapping portions, and the power operated means is operable in the closed position of the blades to exert sufficient pressure on the overlapping portions to compress the sealing means between them.

3. The double louver damper of claim 1 or 2 in which, in the open position of the blades, the first and second portions of each pair of corresponding blades so overlap as to form a streamlined closed figure which in cross section is that of a parallelogram and the length of which is approximately fifty percent more than the width of either blade.

4. The double louver damper of claim 2 in which the sealing means consists of flexible metal strips, each having a lengthwise protuberance and a flat margin secured to the appropriate one of the overlapping portions and the free edge of the protuberance close to the edges thereof and in slidable engagement therewith.

5. The double louver damper of claim 4 in which the protuberance is, in cross section, in the form of an obtuse angle.

6. The double louver damper of claims 1 or 2 in which the blades are so dimensioned that in the open position of the blades, the ends of the streamlined figure do not protrude beyond the ends of the frame.

7. The double louver damper of claim 1 in which each of the resiliently flexible sealing means attached to the frame consists of flexible metal strips each strip having a central lengthwise protuberance with one margin welded to the frame, and a retainer welded to the frame slidably confines the other margin.

* * * * *